UNITED STATES PATENT OFFICE.

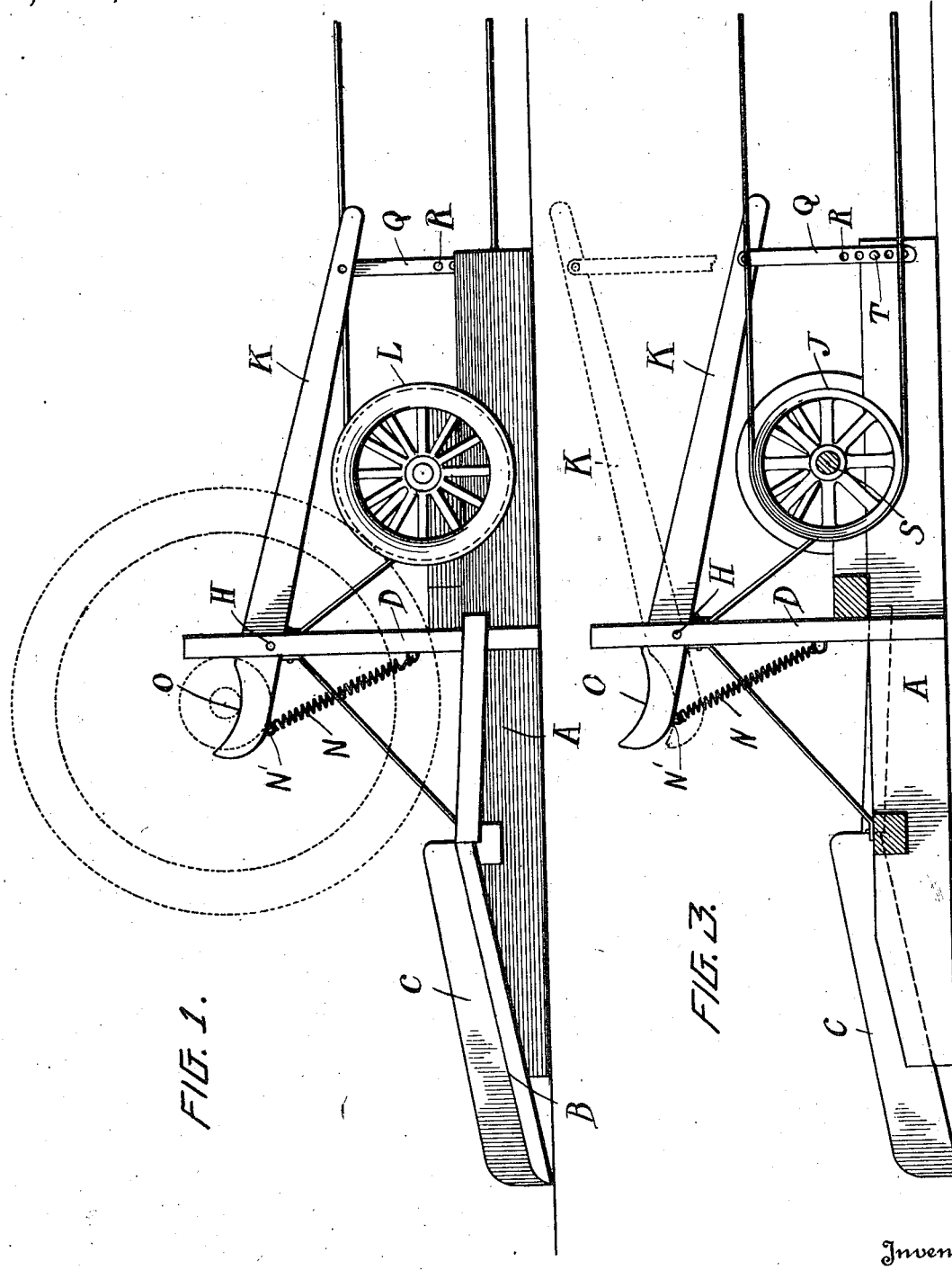

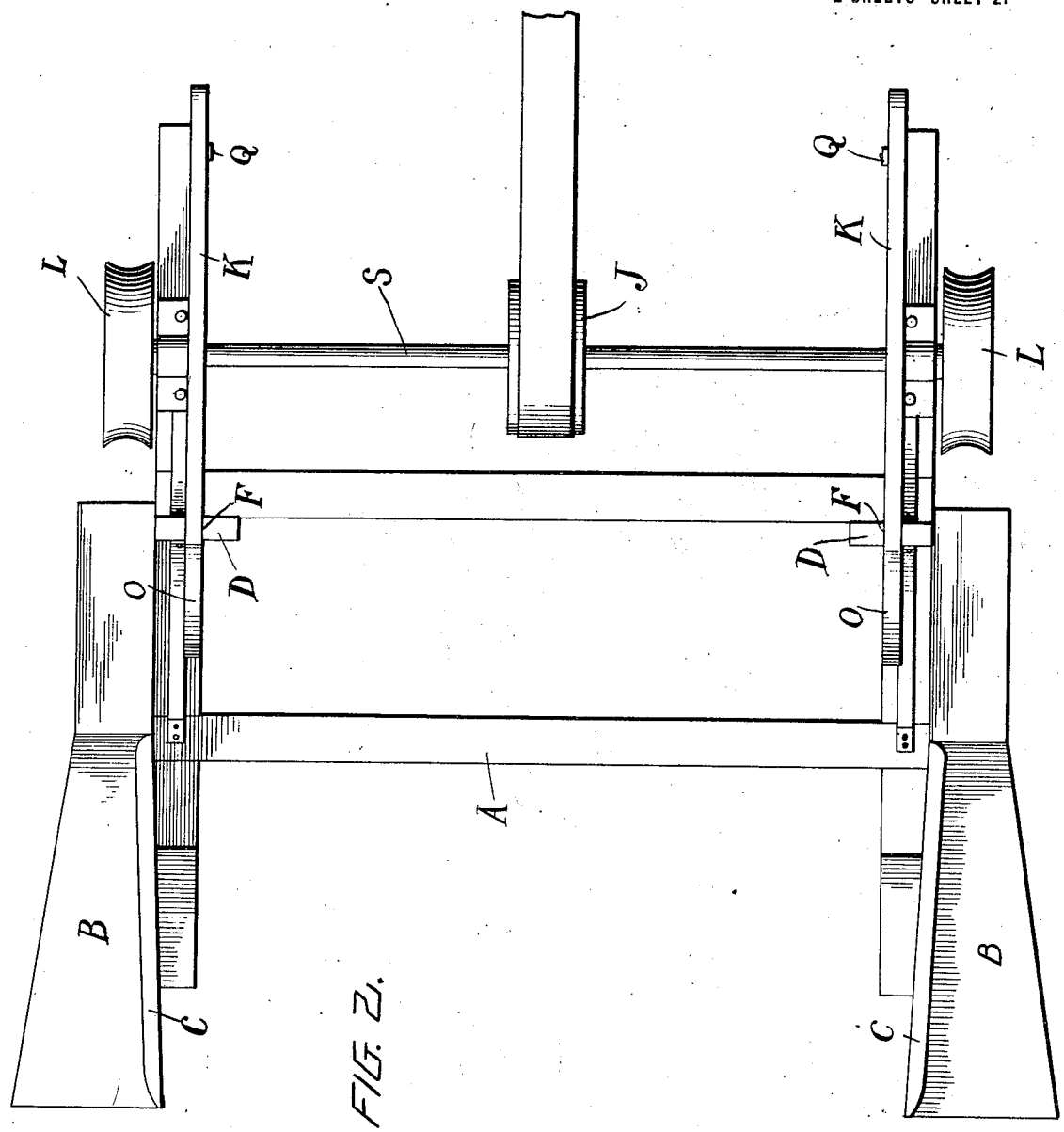

JOHN J. KOGER, OF MORRISTOWN, TENNESSEE.

POWER-TRANSMITTING APPARATUS.

1,218,278.           Specification of Letters Patent.           Patented Mar. 6, 1917.

Application filed September 11, 1916. Serial No. 119,528.

*To all whom it may concern:*

Be it known that I, JOHN J. KOGER, a citizen of the United States, residing at Morristown, in the county of Hamblen and State of Tennessee, have invented certain new and useful Improvements in Power-Transmitting Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in auto power transmitting apparatus and the object in view is to produce an apparatus so arranged that an automobile may be run up the inclined ways, forming a part of the device, and elevated by lever mechanism and held in suspension, thereby making it possible to connect up the rear power driven axle of an automobile with a counter shaft installed with two friction pulleys on each end of said shaft to transmit the power for any purpose.

The present invention comprises various details of construction, combinations and arrangement of parts which will be hereinafter fully described, shown in the accompanying drawings and then specifically defined in the appended claim.

I illustrate my invention in the accompanying drawings, in which:—

Figure 1 is a view in elevation showing the application of my invention.

Fig. 2 is a top plan view.

Fig. 3 is a vertical sectional view, parts being shown in elevation.

Reference now being had to the details of the drawings by letter, A designates the frame of the device having two inclined ways B with a flange C along the marginal edge of each. Each of said ways flares lengthwise as shown and is adapted to guide the wheels of an automobile as they pass up the inclined ways. Posts, designated by letter D, rise from the frame and each is slotted as at F. Pins H pass through registering apertures in the slots and hoisting levers K are pivotally mounted upon said pins. Coiled springs N are fastened at N' one to each post and the other end to the under edge of the short arm of the lever. Each of said levers is concaved as at O to receive the axle of the vehicle as shown and the long arm of each lever is provided with a bar Q fastened at one end thereof, said bars having apertures R to receive the pins T which project from the inner faces of the side pieces of the frame and which are adapted to hold the axle of the machine at different elevations so that the wheels will turn without contact with the ground or floor. Said springs, when under tension, will tend to hold the levers and vehicle from vibrating when the wheels are being driven by the engine of the automobile.

A shaft, designated by letter S, is journaled in suitable bearings upon the frame and has frictionally driven wheels L fixed thereto and which are adapted to be held in contact with the driving wheels of the automobile. A pulley J is fixed to the counter shaft and from which power may be transmitted by belts to any suitable location for driving machines of various kinds.

By the provision of an apparatus embodying the features of my invention, it will be noted that a simple and efficient mechanism is afforded whereby the engine power of an automobile may be utilized for driving threshing machines or other apparatus where power is desired.

What I claim to be new is:—

An automobile power transmitting apparatus comprising a frame having posts, levers pivotally mounted at one side of the longitudinal center upon said posts, springs fastened at their lower ends to the said posts and their upper ends to the short arms of the levers, bars pivotally connected to the long arms of the levers and provided with perforations, means adapted to engage the perforations to hold the levers in different positions, a shaft journaled in suitable bearings in the frame, friction wheels fixed to said shaft and adapted to be frictionally engaged by the driving wheels of a vehicle as the latter is raised by said lever.

In testimony whereof I hereunto affix my signature in presence of two witnesses.

JOHN J. KOGER.

Witnesses:
E. B. KOGER,
W. T. COLEMAN.